(12) United States Patent
Sheng et al.

(10) Patent No.: US 8,836,304 B2
(45) Date of Patent: Sep. 16, 2014

(54) SWITCHING MODE POWER SUPPLY WITH VIRTUAL CURRENT SENSING AND ASSOCIATED METHODS

(75) Inventors: Honggang Sheng, Milpitas, CA (US);
Jinghai Zhou, San Jose, CA (US); Peng Xu, San Jose, CA (US); Chia-Hsin Chang, Santa Clara, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 721 days.

(21) Appl. No.: 13/049,733

(22) Filed: Mar. 16, 2011

(65) Prior Publication Data

US 2012/0235652 A1    Sep. 20, 2012

(51) Int. Cl.
*H02M 3/156* (2006.01)
*H02M 1/00* (2006.01)

(52) U.S. Cl.
CPC ...... *H02M 3/156* (2013.01); *H02M 2001/0009* (2013.01)
USPC ........................................ 323/282

(58) Field of Classification Search
USPC .......... 323/222, 223, 265, 271, 282, 284, 285
See application file for complete search history.

(56) References Cited

U.S. PATENT DOCUMENTS

| 7,615,973 | B2 * | 11/2009 | Uehara | 323/224 |
| 7,936,160 | B1 * | 5/2011 | Sheehan | 323/285 |
| 8,294,433 | B2 * | 10/2012 | Nishida | 323/224 |
| 2009/0224732 | A1 * | 9/2009 | Kudo et al. | 323/271 |

* cited by examiner

*Primary Examiner* — Gary Laxton
*Assistant Examiner* — Afework Demisse
(74) *Attorney, Agent, or Firm* — Perkins Coie LLP

(57) ABSTRACT

The present technology is related generally to a switching mode power supply with virtual current sensing. The switching mode power supply comprises a power stage that includes a first power switch and a second power switch coupled in series. The switching mode power supply senses a first current flowing through the first power switch during on-time and provides a virtual current sense signal that is proportional to a second current flowing through the second power switch during on-time. The switching mode power supply further combines the real current sense signal and the virtual current sense signal to form a current sense signal, which is sent to the controller to realize desired control.

16 Claims, 7 Drawing Sheets

SWITCHING MODE POWER SUPPLY WITH VIRTUAL CURRENT SENSING AND ASSOCIATED METHODS

TECHNICAL FIELD

The present technology relates generally to switching mode power supplies; more particularly, the present technology relates to techniques of current sensing for switching mode power supplies.

BACKGROUND

Current control schemes are widely used in switching mode power supplies. Switching mode power supplies with adaptive voltage position ("AVP") or over current protection (OCP) need to accurately sense an output current. AVP is one way to meet strict transient requirements on switching mode power supplies. The basic principle of the AVP control scheme is illustrated in FIG. 1, in which the ordinate represents an output voltage $V_O$, and the abscissa represents an output current $I_O$. It is believed that the relationship between the output voltage $V_O$ and the output current $I_O$ is as follows:

$$V_O = V_{SET} - R * I_O \qquad (1)$$

where the coefficient R represents the variation slope, and both $V_{SET}$ and R are constant.

The AVP current loop is fast with respect to the outer voltage loop in the system so that it creates an output resistance and keeps the system stable. Prior art AVP control senses the output current by sensing the inductor direct current resistance ("DCR") current. FIG. 2A illustrates one inductor DCR current sensing method in accordance with the prior art. As shown in FIG. 2A, the switching mode power supply senses the inductor current by a capacitor $C_S$ and a resistor $R_S$ connected to an inductor L and its DCR as shown. When the time constant of $C_S \times R_S$ matches the time constant of L/DCR, the voltage of capacitor is equal to the voltage across the DCR, i.e., $V_{CS} = i_L \times DCR$. Because the DCR can be obtained when the inductor is selected, the needed inductor current is proportional to $V_{CS}$/DCR.

However, the controller of such switching mode power supply needs two pins to receive the sensed current. In addition, the sensed current can be affected by the DCR at varied temperatures. FIG. 2B illustrates waveforms of the inductor DCR current $I_L$, the sample pulses $S_{pulse}$, and the sensed current $I_S$ in a switching mode power supply that uses middle current sensing. The middle current sensing technique senses the current by sampling the current in the midpoint of the low-side power switch on time and holding the sampled current until the next cycle. The current in the midpoint of the low-side power switch on time is the average inductor DCR current, or the output current. However, the sample-and-hold process generates a large delay in the feedback loop that can degrade transient performance.

DETAILED DESCRIPTION

Various embodiments of circuits for switching mode power supplies with improved current sensing are described in detail herein. In the following description, some specific details, such as example circuits, are included to provide a thorough understanding of embodiments of the technology. One skilled in the relevant art will recognize, however, that the technology can be practiced without one or more specific details described below with reference to FIGS. 3-9.

Figure 1:
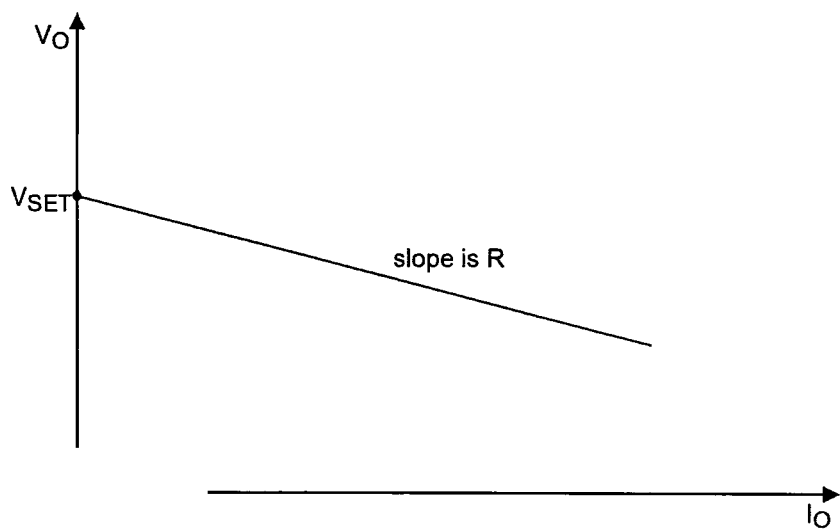
FIG. 1 illustrates a principle of AVP control in accordance with the prior art.
Figure 2A:
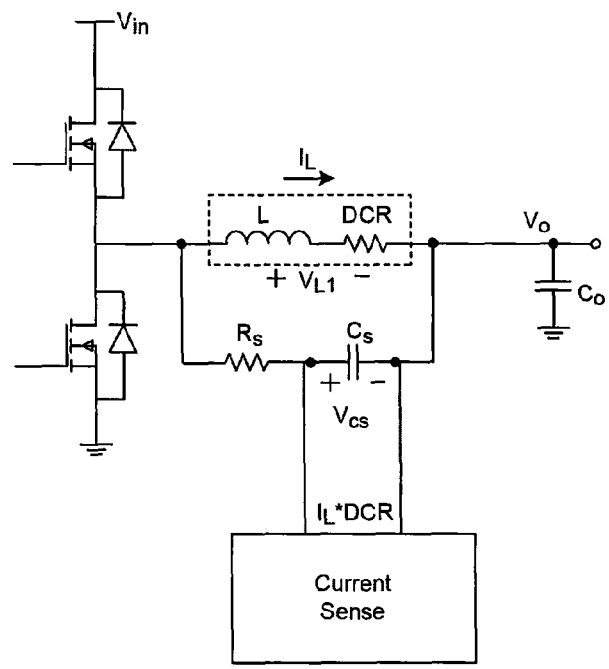
FIG. 2A illustrates a schematic circuit of a prior art switching mode power supply with AVP control.
Figure 2B:
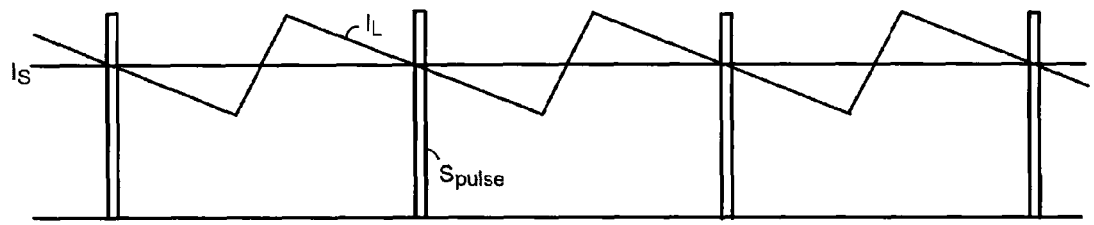
FIG. 2B illustrates schematic waveforms of an inductor DCR current, sample pulses, and a sensed current in a prior art switching mode power supply that uses middle current sensing.
Figure 3:
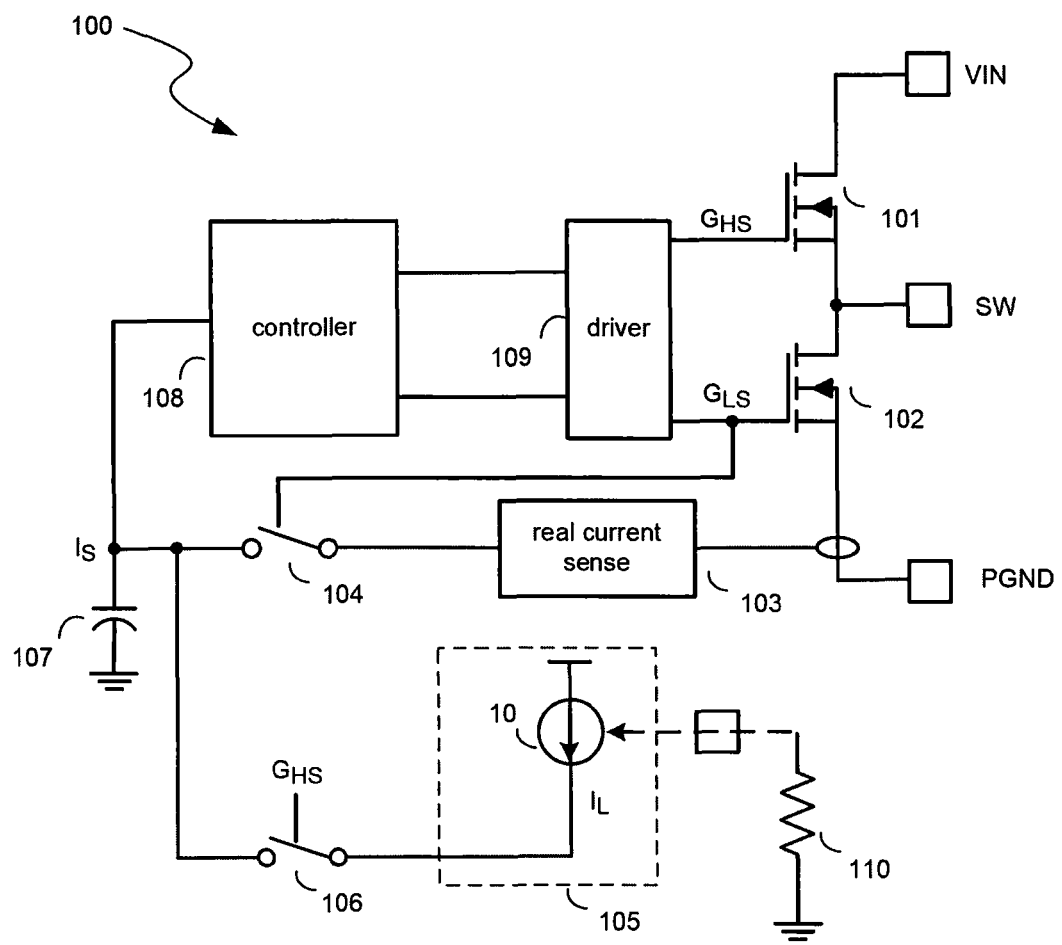
FIG. 3 illustrates a schematic circuit of a switching mode power supply in accordance with an embodiment of the present technology.

FIG. 3 illustrates a schematic circuit of a switching mode power supply 100 in accordance with an embodiment of the present technology. As shown in FIG. 3, the switching mode power supply 100 comprises a power stage. In one embodiment, the power stage comprises a high-side power switch 101 and a low-side power switch 102 coupled in series. In other embodiments, the power stage can include inductors, capacitors, and/or other suitable components.

The switching mode power supply 100 also includes a real current sense circuit 103 configured to monitor a current flowing through the low-side power switch 102 during a low-side power switch on time. The real current sense circuit 103 has an input terminal and an output terminal. The input terminal is coupled to the low-side power switch 102, and the real current sense circuit 103 provides a real current sense signal at the output terminal. The real current sense signal represents the current flowing through the low-side power switch 102 during the low-side power switch on time.

The switching mode power supply 100 also includes a virtual current sense circuit 105 configured to monitor a current flowing through the high-side power switch 101 during a high-side power switch on time. The virtual current sense circuit 105 provides a virtual current sense signal that is related to the current flowing through the high-side power switch 101 during the high-side power switch on time. In one embodiment, the virtual current sense circuit 105 includes a current source 10 that provides the virtual current sense signal, and the switching mode power supply 100 further comprises a resistor 110 that is configured to set the current value $I_L$ of the current source 10. In other embodiments, the virtual current sense circuit 105 can include other suitable components.

A sense capacitor 107 is coupled to the real current sense circuit 103 and the virtual current sense circuit 105 to receive the real current sense signal during the low-side power switch on time and the virtual current sense signal during the high-side power switch on time. Based, at least in part, on the real current sense signal and the virtual current sense signal, the sense capacitor 107 provides a current sense signal $I_S$. In one embodiment, the switching mode power supply 100 further comprises a first sense switch 104 for coupling the real current sense signal to the sense capacitor 107 during the low-side power switch on time, and a second sense switch 106 for coupling the virtual current sense signal to the sense capacitor 107 during the high-side power switch on time. In other embodiments, the first and/or second sense switch 104 and 106 may be omitted and/or replaced with other suitable components.

As shown in FIG. 3, a controller 108 is coupled to the sense capacitor 107 to receive the current sense signal $I_S$, and, based on the current sense signal $I_S$, provides a control signal. The switching mode power supply 100 further includes a driver 109 that receives the control signal from the controller 108, and, based on the control signal, that provides a driving signal to the power stage.

During operation, when the low-side power switch 102 is on, and the high-side power switch 101 is off, the first sense switch 104 is on, and the second sense switch 106 is off. Then the real current sense circuit 103 provides the real current sense signal to the sense capacitor 107. As a result, the voltage across the sense capacitor 107 decreases linearly as the current flowing through the low-side power switch 102 decreases. Thus, the current sense signal $I_S$ follows the current flowing through the low-side power switch 102 during this low-side power switch on time. When the high-side power switch 101 is on, and the low-side power switch 102 is off, the first sense switch 104 is off, and the second sense switch 106 is on. Then the current source 10 charges the sense capacitor 107, and thus the voltage across the sense capacitor 107, i.e., the current sense signal $I_S$ increases linearly from the current value $I_L$ during this high-side power switch on time. The current sense signal $I_S$ and the driving signals of the high-side power switch and the low-side power switch are shown in FIG. 4.

In certain embodiments, the current sense signal $I_S$ may be formed by the real current flowing through the low-side power switch 102 and the virtual current flowing through the high-side power switch 101. The real current flowing through the low-side power switch 102 is sensed by the real current sense circuit 103, and the virtual current flowing through the high-side power switch 101 is simulated by the virtual current sense circuit 105. Then the current sense signal $I_S$ is sent to the controller 108 to realize a desired control technique, such as AVP control, OCP control, and/or other suitable control techniques.

Figure 4:
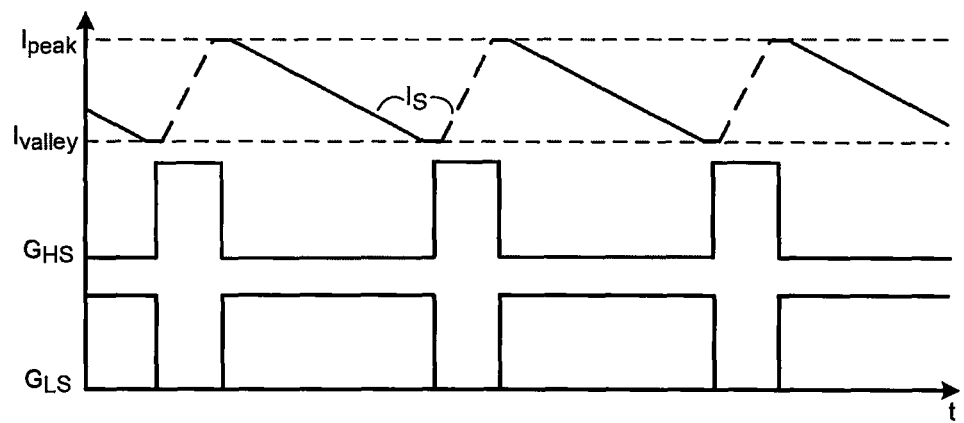
FIG. 4 illustrates a schematic waveform of a current sense signal and driving signals in a switching mode power supply in accordance with an embodiment of the present technology.

As shown in FIG. 4, the current sense signal $I_S$ has a maximal magnitude $I_{PEAK}$, and a minimum magnitude $I_{valley}$, so a slew rate of the virtual current flowing through the high-side power switch 102 may be calculated as follows:

$$\frac{di}{dt} \approx \frac{I_{peak} - I_{valley}}{t_{onHS}} \quad (2)$$

where $t_{onHS}$ represents the on time period of the high-side power switch 101.

Figure 5:
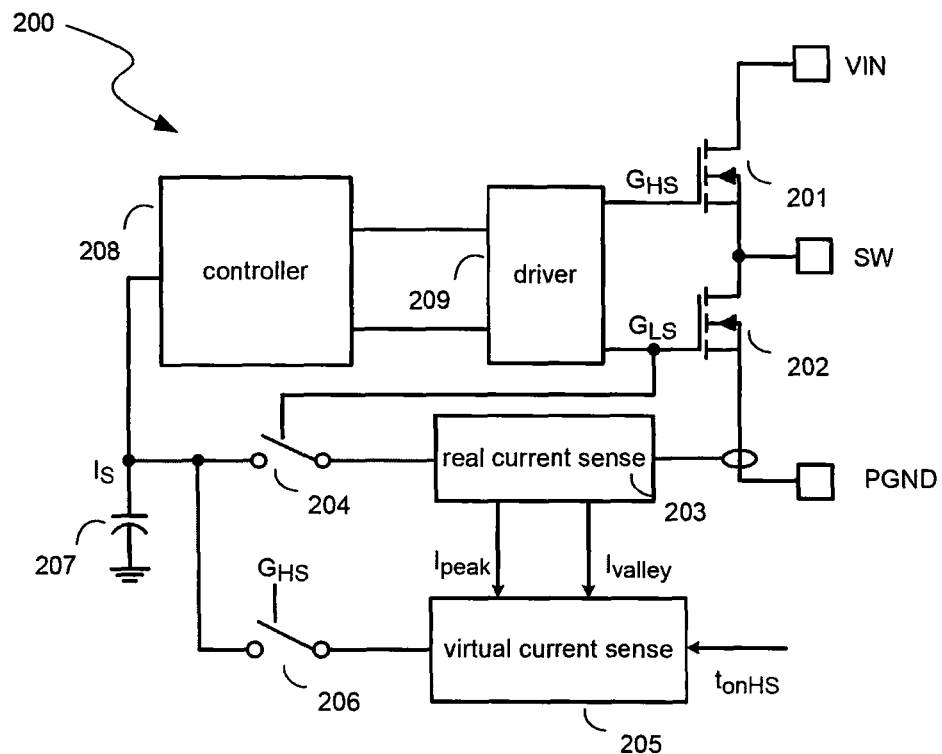
FIG. 5 illustrates a schematic circuit of a switching mode power supply in accordance with an embodiment of the present technology.

FIG. 5 illustrates a schematic circuit of a switching mode power supply 200 having a virtual current sense circuit 205 that realizes the above function (2) in accordance with an embodiment of the technology. Specifically, in the illustrated embodiment, the switching mode power supply 200 comprises a power stage having a high-side power switch 201 and a low-side power switch 202 coupled in series. A real current sense circuit 203 is configured to monitor a current flowing through the low-side power switch 202 during a low-side power switch on time. The real current sense circuit 203 has an input terminal and an output terminal. The input terminal is coupled to the low-side power switch 202, and the real current sense circuit 203 provides a real current sense signal at the output terminal. The real current sense signal represents a current flowing through the low-side power switch 202 during the low-side power switch on time.

The virtual current sense circuit 205 is configured to monitor a current flowing through the high-side power switch 201 during a high-side power switch on time, and the virtual current sense circuit 205 provides a virtual current sense signal in response to the maximal magnitude $I_{PEAK}$, minimum magnitude $I_{valley}$, and the high-side power switch on time $t_{onHS}$. In one embodiment, the switching mode power supply 200 further comprises a first sense switch 204 for coupling the real current sense signal to the sense capacitor 207 during the low-side power switch on time; and a second sense switch 206 for coupling the virtual current sense signal to the sense capacitor 207 during the high-side power switch on time.

A sense capacitor 207 is coupled to the real current sense circuit 203 and the virtual current sense circuit 205 to receive the real current sense signal during the low-side power switch on time and the virtual current sense signal during the high-side power switch on time, and, based on the real current sense signal and the virtual current sense signal, provides the current sense signal $I_S$. A controller 208 is coupled to the sense capacitor 207 to receive the current sense signal $I_S$, and, based on the current sense signal $I_S$, that provides a control signal; and a driver 209 that receives the control signal from the controller 208, and based on the control signal, that provides a driving signal to the power stage.

During the on time of the low-side power switch 202, the real current sense circuit 203 provides the real current sense signal to the sense capacitor 207, and provides the maximal magnitude $I_{PEAK}$, which represents the peak magnitude of the current flowing through the low-side power switch 202, the minimum magnitude $I_{valley}$, which represents the valley magnitude of the current flowing through the low-side power switch 202, and the high-side power switch on time t to the virtual current sense circuit 205. Thus, during the high-side power switch on time, the virtual current sense circuit 205 executes equation (2) to obtain a slew rate $$\frac{di}{dt}.$$

Then the slew rate is used to calculate the virtual current flowing through the high-side power switch 201, which is then delivered to the sense capacitor 207 to obtain the current sense signal $I_S$. The current sense signal $I_S$ then is sent to the controller 208 to realize a desired control, such as AVP control, OCP control, and/or other suitable control techniques.

Figure 6:
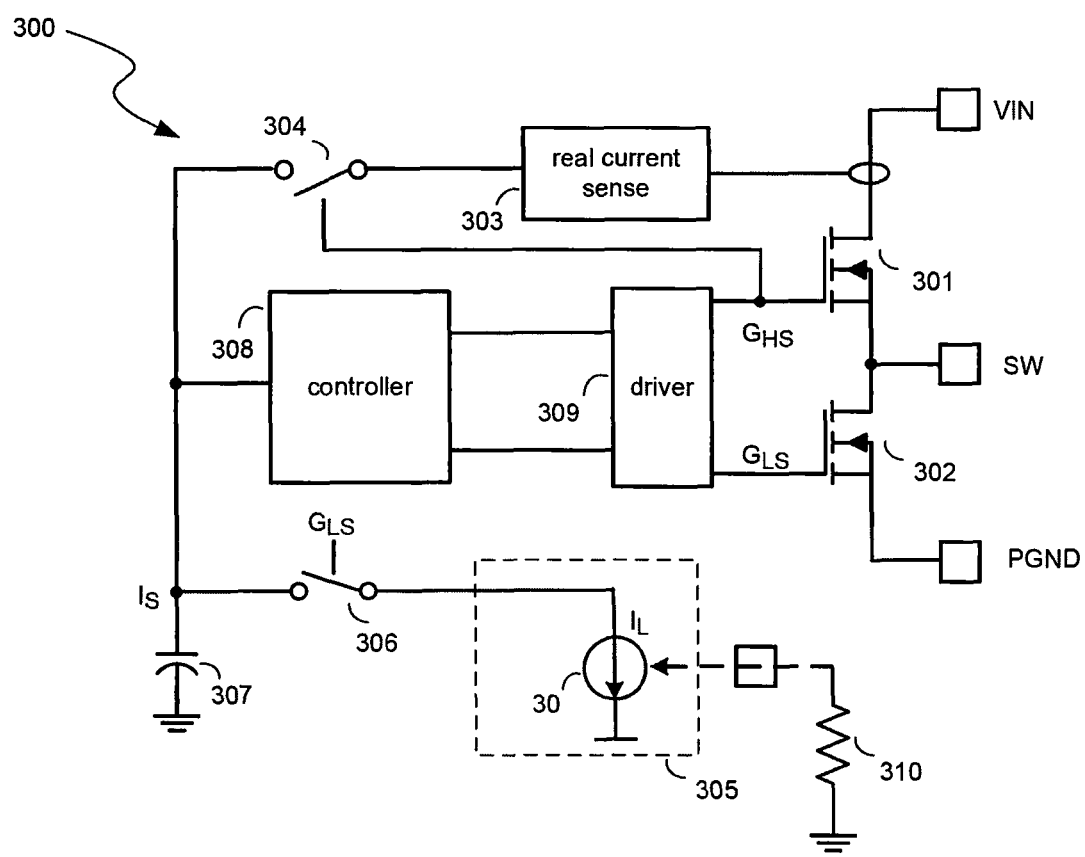
FIG. 6 illustrates a schematic circuit of a switching mode power supply in accordance with an embodiment of the present technology.

FIG. 6 illustrates a schematic circuit of a switching mode power supply 300 in accordance with an embodiment of the present technology. As shown in FIG. 6, the switching mode power supply 300 comprises a power stage that comprises a high-side power switch 301 and a low-side power switch 302 coupled in series; and a real current sense circuit 303 configured to monitor a current flowing through the high-side power switch 301 during a high-side power switch on time. The real current sense circuit 303 has an input terminal and an output terminal. The input terminal is coupled to the high-side power switch 301, and the real current sense circuit 303 provides a real current sense signal at the output terminal, which represents the current flowing through the high-side power switch 301 during the high-side power switch on time period.

The switching mode power supply 300 also includes a virtual current sense circuit 305 configured to monitor the current flowing through the low-side power switch 302 during a low-side power switch on time. The virtual current sense circuit 305 provides a virtual current sense signal that is related to the current flowing through the low-side power switch 302 during the low-side power switch on time. A sense capacitor 307 is coupled to the real current sense circuit 303 and the virtual current sense circuit 305 to receive the real current sense signal during the high-side power switch on time and the virtual current sense signal during the low-side power switch on time. Based on the real current sense signal and the virtual current sense signal, the sense capacitor 307 provides a current sense signal $I_S$. A controller 308 is coupled to the sense capacitor 307 to receive the current sense signal $I_S$, and, based on the current sense signal $I_S$, provides a control signal. The switching mode power supply 300 further includes a driver 309 that receives the control signal from the controller 308, and, based on the control signal, that provides a driving signal to the power stage.

In one embodiment, the switching mode power supply 300 further comprises a first sense switch 304 coupling the real current sense signal to the sense capacitor 307 during the high-side power switch 301 on time; and a second sense switch 306 coupling the virtual current sense signal to the sense capacitor 307 during the low-side power switch 302 on time. In one embodiment, the virtual current sense circuit 305 includes a current source 30 that provides the virtual current sense signal. In one embodiment, the switching mode power supply 300 further comprises a resistor 310 that is configured to set the current value $I_L$ of the current source 30.

In contrast to the switching mode power supply 100 (FIG. 3), the switching mode power supply 300 receives the inductor current information by sensing the real current flowing through the high-side power switch 301, and providing the virtual current flowing through the low-side power switch 302. Specifically, during operation, when the high-side power switch 301 is on, and the low-side power switch 302 is off, the first sense switch 304 is on, and the second sense switch 306 is off. Then the real current sense signal is delivered to the sense capacitor 307. Thus, the voltage across the sense capacitor 307 increases linearly as the current flowing through the high-side power switches 301 increases, i.e., the current sense signal $I_S$ follows the current flowing through the high-side power switch 301 during this high-side power switch on time period.

Figure 7:
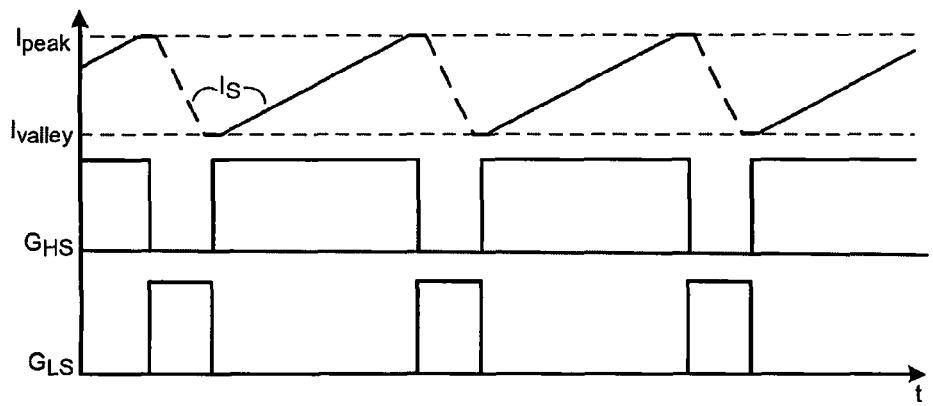
FIG. 7 illustrates a schematic waveform of a current sense signal and driving signals in the switching mode power supply in accordance with an embodiment of the present technology.

When the low-side power switch 302 is on, and the high-side power switch 301 is off, the first sense switch 304 is off, and the second sense switch 306 is on. Then the sense capacitor 307 is discharged by the current source 30, and thus the voltage across the sense capacitor 307, i.e., the current sense signal $I_S$ decreases linearly from the current value $I_{peak}$ during this low-side power switch on time. The current sense signal $I_S$ and the driving signals of the high-side power switch 301 and the low-side power switch 302 are shown in FIG. 7. As a result, the current sense signal $I_S$ is formed by the real current flowing through the high-side power switch 301 and the virtual current flowing through the low-side power switch 302. The real current flowing through the high-side power switch 301 is sensed by the real current sense circuit 303, and the virtual current flowing through the low-side power switch 302 is simulated by the virtual current sense circuit 305. Then the current sense signal $I_S$ is transmitted to the controller 308 to realize a desired control technique, such as AVP control, OCP control, and/or other suitable control techniques.

As shown in FIG. 7, the current sense signal $I_S$ has a maximal magnitude $I_{PEAK}$, and a minimum magnitude $I_{valley}$, so a slew rate of the virtual current sense signal may be calculated as follows:

$$\frac{di}{dt} \approx \frac{I_{peak} - I_{valley}}{t_{onLS}} \quad (3)$$

where $t_{onLS}$ represents the on time period of the low-side power switch 302.

Figure 8:
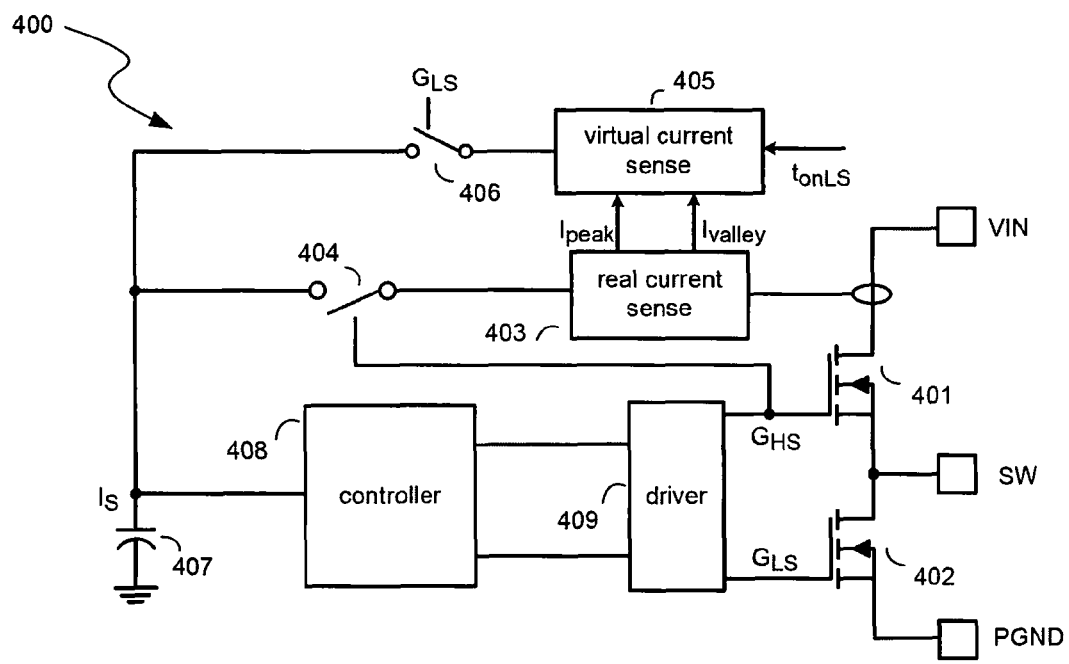
FIG. 8 illustrates a schematic circuit of a switching mode power supply in accordance with an embodiment of the present technology.

FIG. 8 illustrates a schematic circuit of a switching mode power supply 400 that is comprised of a virtual current sense circuit 405 that realizes the above function (3) in accordance with an embodiment of the technology. Specifically, the switching mode power supply 400 is comprised of a power stage that comprises a high-side power switch 401 and a low-side power switch 402 coupled in series. A real current sense circuit 403 is configured to monitor a current flowing through the high-side power switch 401 during a high-side power switch on time. The real current sense circuit 403 has an input terminal and an output terminal, and the input terminal is coupled to the high-side power switch 401. The real current sense circuit 403 provides a real current sense signal at the output terminal, which represents the current flowing through the high-side power switch 401 during the high-side power switch on time.

The switching mode power supply 400 also includes a virtual current sense circuit 405 configured to monitor a current flowing through the low-side power switch 402 during a low-side power switch on time. The virtual current sense circuit 405 provides a virtual current sense signal in response to the maximal magnitude $I_{PEAK}$, minimum magnitude $I_{valley}$, and the low-side power switch on time $t_{onLS}$. A sense capacitor 407 is coupled to the real current sense circuit 403 and the virtual current sense circuit 405 to receive the real current sense signal during the high-side power switch on time and the virtual current sense signal during the low-side power switch on time. Based on the real current sense signal and the virtual current sense signal, the sense capacitor 407 provides the current sense signal $I_S$ to a controller 408 that is coupled to the sense capacitor 407. Based on the current sense signal $I_S$, the controller 408 provides a control signal to a driver 409 that receives the control signal from the controller 408, and, based on the control signal, provides a driving signal to the power stage. In one embodiment, the switching mode power supply 400 further comprises a first sense switch 404 for coupling the real current sense signal to the sense capacitor 407 during the high-side power switch 401 on time; and a second sense switch 406 for coupling the virtual current sense signal to the sense capacitor 407 during the low-side power switch on time.

During the on time of the high-side power switch 401, the real current sense circuit 403 provides the real current sense signal to the sense capacitor 407, and provides the maximal magnitude $I_{PEAK}$, which represents the peak magnitude of the current flowing through the high-side power switch 401, the minimum magnitude $I_{valley}$, which represents the valley magnitude of the current flowing through the high-side power switch 401, and the low-side power switch on time $t_{onLS}$ to the virtual current sense circuit 405. Thus, during the low-side power switch on time, the virtual current sense circuit 405 executes equation (3) to obtain a slew rate. Then the slew rate is used to calculate the virtual current flowing through the low-side power switch 402, which is further delivered to the sense capacitor 407 to get the current sense signal $I_S$. The current sense signal $I_S$ then is transmitted to the controller 408 to realize a desired control technique, such as AVP control, OCP control, and/or other suitable control techniques.

The switching mode power supply 100/200/300/400 illustrated hereinbefore adopts a first sense switch to couple a real current sense signal to a sense capacitor during a first power switch (e.g., the high-side power switch) on time, and a second sense switch to couple a virtual current sense signal to the sense capacitor during the second power switch (e.g., the low-side power switch) on time. However, in other embodiments, a switching mode power supply may only adopt a select switch (not shown) that couples the real current sense signal to the sense capacitor during the first power switch on time and the virtual current sense signal to the sense capacitor during the second power switch on time. The operation of the switching mode power supply adopting a select switch is similar to the switching mode power supply 100/200/300/400 illustrated hereinbefore.

Figure 9:
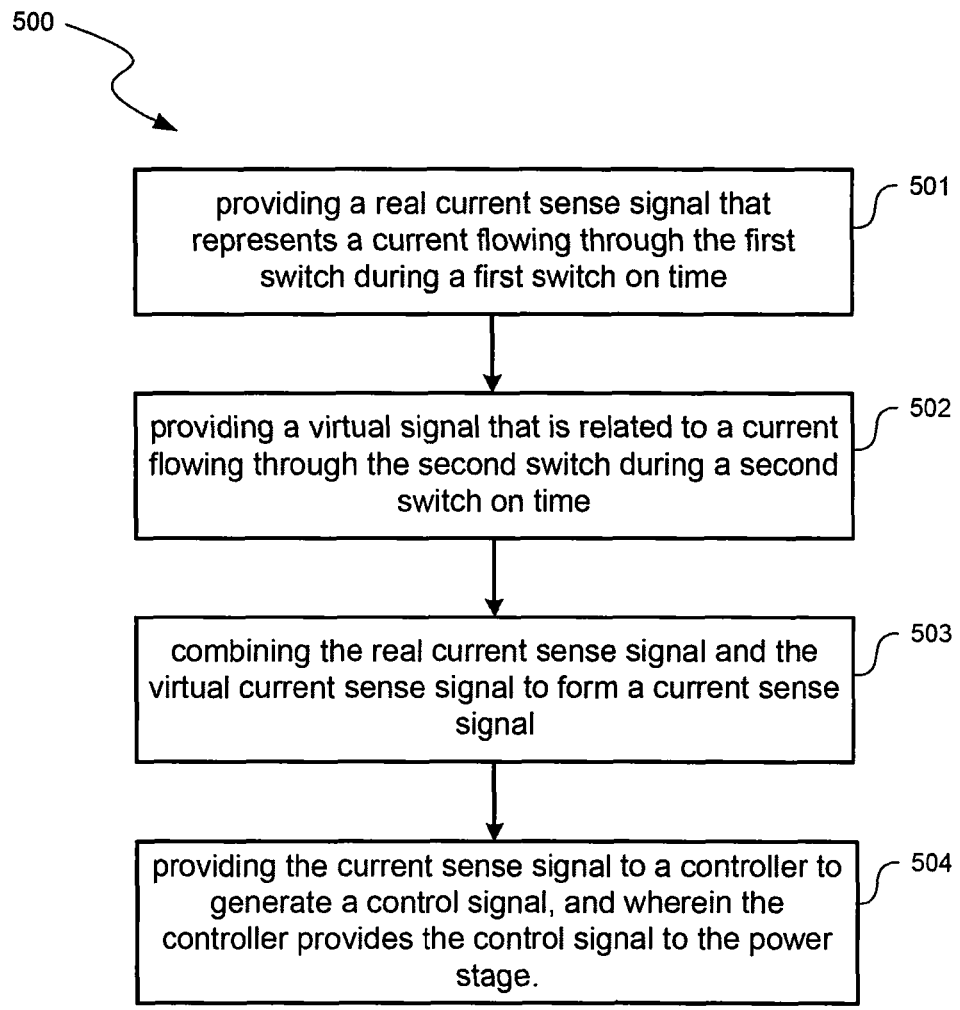
FIG. 9 is a flowchart that illustrates a method used in a switching mode power supply in accordance with an embodiment of the present technology.

FIG. 9 illustrates a flowchart 500 that illustrates a method used in a switching mode power supply comprised of a power stage including a first power switch and a second power switch coupled in series in accordance with an embodiment of the present technology. As shown in FIG. 9, the method comprises: block 501, providing a real current sense signal that represents a current flowing through the first power switch during a first power switch on time; block 502, providing a virtual current sense signal that is related to a current flowing through the second power switch during a second power switch on time; block 503, combining the real current sense signal and the virtual current sense signal to form a current sense signal; block 504, providing the current sense signal to a controller to generate a control signal, and wherein the controller provides the control signal to the power stage. In one embodiment, the virtual current sense signal is set by a resistor. In one embodiment, the method further comprises providing (1) a maximal magnitude that represents a peak magnitude of the current flowing through the first power switch current, (2) a minimum magnitude $I_{valley}$ that represents the valley magnitude of the current flowing through the first power switch current, and (3) an on time signal of the second power switch. The virtual current sense signal is calculated by executing the maximum signal, the minimum magnitude and the on time signal with a mathematic function.

From the foregoing, it will be appreciated that specific embodiments of the technology have been described herein for purposes of illustration, but that various modifications may be made without deviating from the disclosure. In addition, many of the elements of one embodiment may be combined with other embodiments in addition to or in lieu of the elements of the other embodiments. Accordingly, the disclosure is not limited except as by the appended claims.

We claim:

1. A switching mode power supply, comprising:
a power stage comprising a first power switch and a second power switch coupled in series;
a real current sense circuit configured to monitor a current flowing through the first power switch during a first power switch on time, wherein the real sense circuit has an input terminal and an output terminal, and wherein the input terminal is coupled to the first power switch, and wherein the real current sense circuit is configured to provide a real current sense signal at the output terminal, the real current sense signal corresponding to the current flowing through the first power switch during the first power switch on time;
a virtual current sense circuit configured to monitor a current flowing through the second power switch during a second power switch on time, wherein the virtual current sense circuit is configured to provide a virtual current sense signal that is related to the current flowing through the second power switch during the second power switch on time;
a sense capacitor coupled to the real current sense circuit and the virtual current sense circuit to receive the real current sense signal during the first power switch on time and the virtual current sense signal during the second power switch on time, and to provide a current sense signal based thereon;
a controller coupled to the sense capacitor to receive the current sense signal, and to provide a control signal based on the received current sense signal; and
a driver coupled to the controller to receive the control signal, and to provide a driving signal to the power stage based on the received control signal; wherein
the real current sense circuit is further configured to provide (1) a maximum signal that represents a peak magnitude of the current flowing through the first power switch, (2) a minimum signal that represents a valley magnitude of the current flowing through the first power switch, and (3) an on time signal of the second power switch to the virtual current sense circuit; and wherein
the virtual current sense circuit is further configured to calculate the virtual current sense signal based on the maximum signal, the minimum signal, and the on time signal.

2. The switching mode power supply of claim 1, further comprising:
a first sense switch coupling the real current sense signal to the sense capacitor during the first power switch on time; and
a second sense switch coupling the virtual current sense signal to the sense capacitor during the second power switch on time.

3. The switching mode power supply of claim 1, further comprising a select switch configured to couple the real current sense signal to the sense capacitor during the first power switch on time, and to couple the virtual current sense signal to the sense capacitor during the second power switch on time.

4. The switching mode power supply of claim 1, wherein the virtual current sense circuit comprises a current source.

5. The switching mode power supply of claim 4, further comprising a resistor configured to set an output current of the current source.

6. The switching mode power supply of claim 1, wherein the controller is configured to execute an adaptive voltage position control technique to generate the control signal.

7. The switching mode power supply of claim 1, wherein the controller is configured to execute an over current protection control technique to generate the control signal.

8. A switching mode power supply, comprising:
a power stage comprising a first power switch and a second power switch;
means for providing a real current sense signal that represents a current flowing through the first power switch during a first power switch on time;
means for providing a virtual current sense signal that represents a current flowing through the second power switch during a second power switch on time;

means for providing a current sense signal based on the real current sense signal and the virtual current sense signal;

means for providing a control signal based on the current sense signal; and means for providing a driving signal to the power stage based on the control signal; and wherein the means for providing the current sense signal receives the real current sense signal during the first power switch on time and the virtual current sense signal during the second power switch on time; wherein the means for providing the real current sense signal includes means for providing (1) a maximal signal that represents a peak magnitude of the current flowing through the first power switch, (2) a minimum signal that represents a valley magnitude of the current flowing through the first power switch, and (3) an on time signal of the second power switch to the virtual current sense signal; and wherein the means for providing the virtual current sense signal includes means for providing the virtual current sense signal based on the maximum signal, the minimum signal, and the on time signal.

9. The switching mode power supply of claim 8, further comprising means for selectively coupling the real current sense signal to a sense capacitor during the first power switch on time, and selectively coupling the virtual current sense signal to the sense capacitor during the second power switch on time.

10. The switching mode power supply of claim 8, wherein the virtual current sense signal comprises a current source.

11. The switching mode power supply of claim 10, further comprising means for setting a current value of the current source.

12. The switching mode power supply of claim 8, wherein the means for providing the control signal executes an adaptive voltage position control technique to generate the control signal.

13. The switching mode power supply of claim 8, wherein the means for providing the control signal executes an over current protection control technique to generate the control signal.

14. A method used in a switching mode power supply that comprises a power stage including a first power switch and a second power switch coupled in series, the method comprising:

providing a real current sense signal that represents a current flowing through the first power switch during a first power switch on time;

providing (1) a maximum signal that represents a peak magnitude of the current flowing through the first power switch, (2) a minimum signal that represents the valley magnitude of the current flowing through the first power switch, and (3) an on time signal of the second power switch;

providing a virtual current sense signal that is related to a current flowing through the second power switch during a second power switch on time, wherein providing the virtual current sense signal includes calculating the virtual current sense signal based on the maximum signal, the minimum signal and the on time signal;

combining the real current sense signal and the virtual current sense signal to form a current sense signal; and providing the current sense signal to a controller to generate a control signal to the power stage.

15. The method of claim 14, wherein providing the virtual current sense signal includes setting the virtual current sense signal by a resistor.

16. The method of claim 14, wherein providing the current sense signal includes executing an adaptive voltage position control technique or an over current protection control technique to generate the control signal.

* * * * *